United States Patent [19]

Steele

[11] Patent Number: 4,788,833
[45] Date of Patent: Dec. 6, 1988

[54] DRIER FOR AIR CONDITIONING SYSTEM

[75] Inventor: Luther R. Steele, Forth Worth, Tex.

[73] Assignee: Frigette Corporation, Fort Worth, Tex.

[21] Appl. No.: 157,269

[22] Filed: Feb. 18, 1988

[51] Int. Cl.⁴ ............................................. F25B 43/00
[52] U.S. Cl. ..................................... 62/474; 210/282; 285/331; 285/915; 403/267
[58] Field of Search ............. 62/474, 85; 210/DIG. 6, 210/282; 403/265, 267, 349; 285/331, 915

[56] References Cited

U.S. PATENT DOCUMENTS

| | | | |
|---|---|---|---|
| 2,365,149 | 12/1944 | Anderson | 210/139 |
| 3,002,870 | 10/1961 | Belgarde et al. | 156/70 |
| 3,118,288 | 1/1964 | Small | 62/474 X |
| 3,122,501 | 2/1964 | Hultgren | 210/94 |
| 3,266,628 | 8/1966 | Price | 210/94 |
| 3,298,528 | 1/1967 | Franck | 210/444 |
| 3,423,781 | 1/1969 | Henson | 403/349 X |
| 3,426,779 | 2/1969 | Corbin | 137/68.1 |
| 3,545,227 | 12/1970 | Grahl | 62/474 |
| 3,701,548 | 10/1972 | McGuire | 285/81 |
| 3,997,195 | 12/1976 | Bartholomew | 285/331 X |
| 4,062,774 | 12/1977 | Hinojosa | 210/94 |
| 4,072,615 | 2/1978 | McConnell | 210/282 |
| 4,256,333 | 3/1981 | Jones | 285/331 X |
| 4,331,001 | 5/1982 | Jones | 62/474 X |
| 4,364,756 | 12/1982 | Clarke et al. | 62/85 X |
| 4,633,679 | 1/1987 | Winterstein | 62/474 |
| 4,649,719 | 3/1987 | Yanazisawa | 62/474 |
| 4,652,367 | 3/1987 | Reulecke et al. | 210/94 |
| 4,675,971 | 6/1987 | Masserang | 29/422 |

Primary Examiner—William E. Tapolcai
Attorney, Agent, or Firm—Marshall, O'Toole, Gerstein, Murray & Bicknell

[57] ABSTRACT

A drier comprising a pressure cylinder formed by two cylinder parts. One cylinder part has inlet and outlet flow fittings on it, for connection of the cylinder in the refrigerant circuit. The two cylinder parts further have passages in them for the flow of the refrigerant, and desiccant modules mounted in the passages to remove water from the refrigerant. The two cylinder parts are made of molded plastic and are round and cup shaped. The annular open sides of the two parts are attached together by a lug-in-groove twist lock connection. Further, the annular open sides have a scarf joint formed thereon, and the parts are bonded together at the joint to form a strong integral construction. A sight glass is provided at one end of the cylinder and a blow-out plug may be provided at the opposite end.

6 Claims, 2 Drawing Sheets

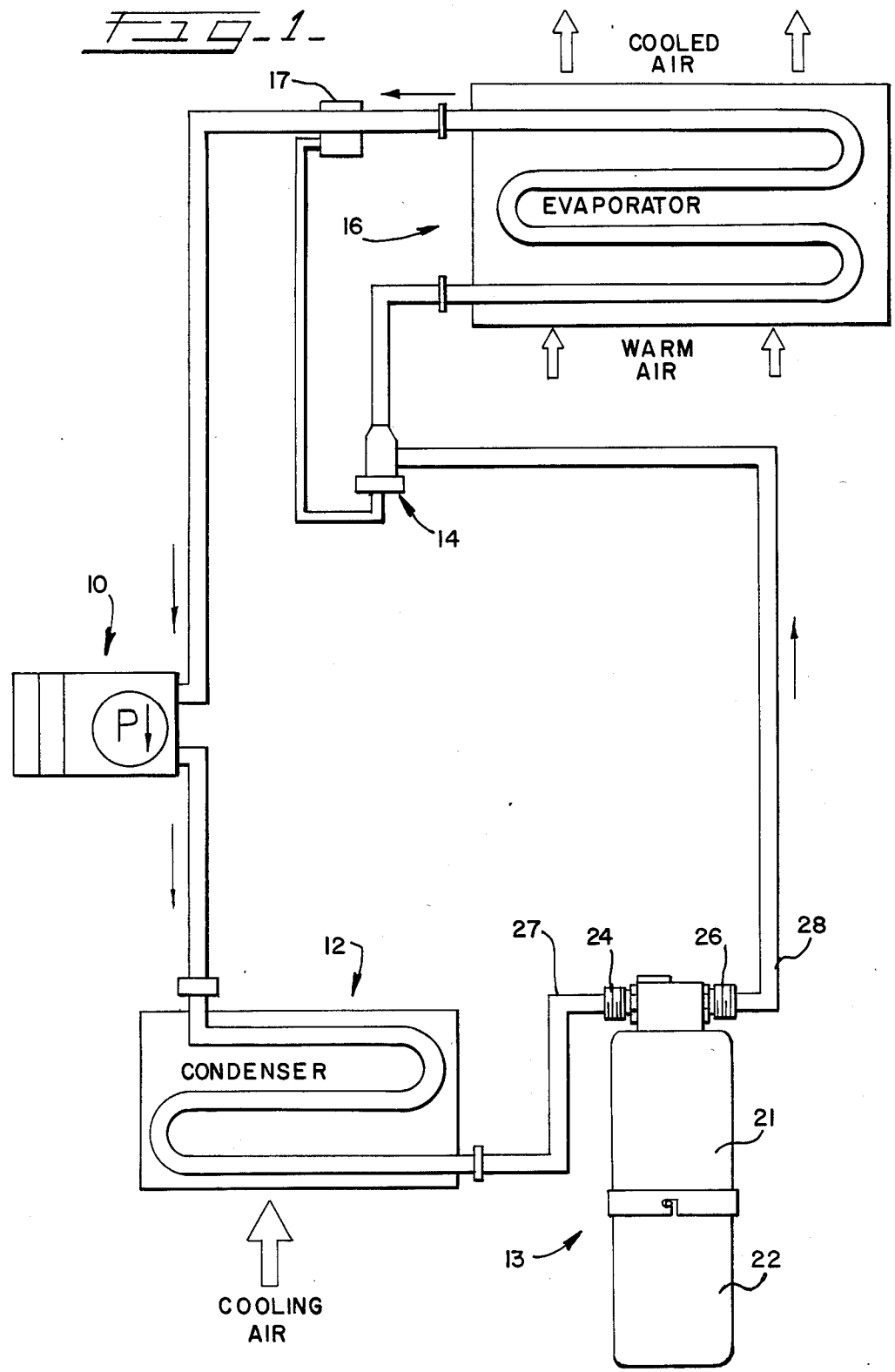

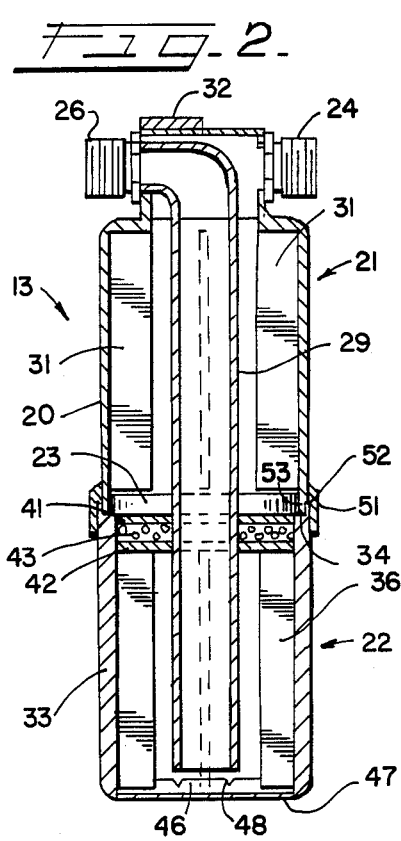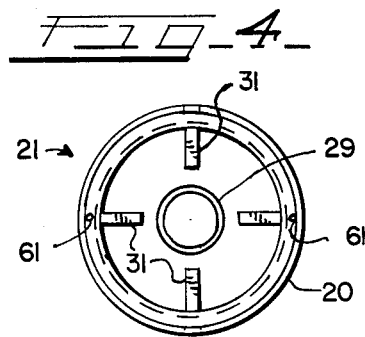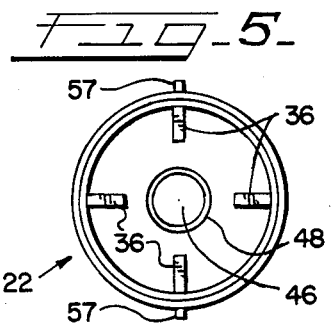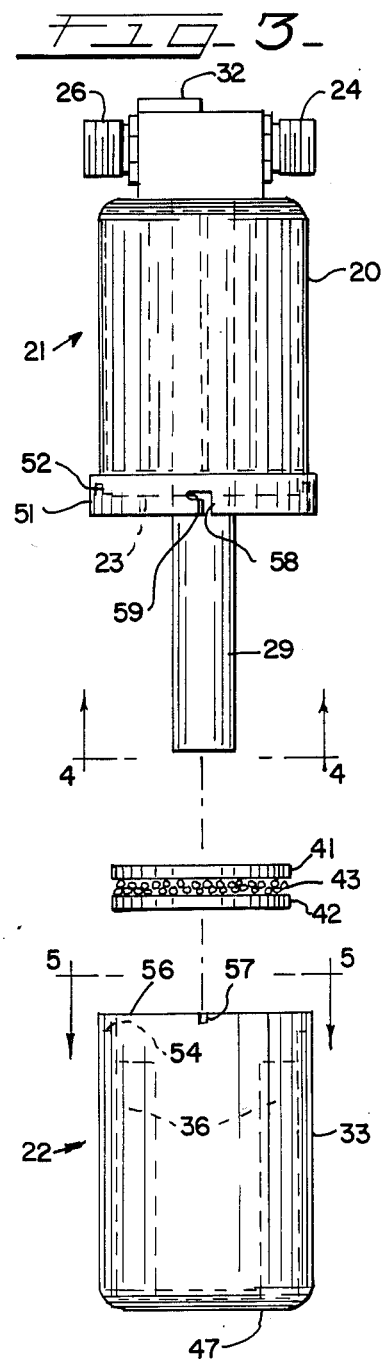

DRIER FOR AIR CONDITIONING SYSTEM

FIELD AND BACKGROUND OF THE INVENTION

This invention relates to air conditioning systems, and more specifically to a drier for such a system.

Air conditioning systems such as those for vehicles are, of course, well known, and such systems usually include a drier. The drier often is combined with a receiver connected between the condenser and the evaporator, this unit having a number of functions. The receiver functions to assure that a supply of liquid refrigerant flows to the orifice or the expansion valve, and the drier removes any water from the to remove any particles in the refrigerant, and it may also include a sight glass for checking the operation of the system.

Receiver-drier units, as described above, have been provided in prior art systems such as those for motor vehicles. Prior art units have, however, been relatively expensive to produce because they are made of metal which is fairly expensive to fabricate and assemble. Metal also has the disadvantage that it can introduce rust and other contaminants into the refrigerant.

It is therefore a general object of the present invention to provide an improved drier for an air conditioning system, which avoids the foregoing disadvantages.

SUMMARY OF THIS INVENTION

A drier in accordance with this invention comprises a pressure cylinder formed by two cylinder parts. One cylinder part has inlet and outlet flow fittings on it, for connection of the cylinder in the refrigerant circuit. The two cylinder parts further have passages in them for the flow of the refrigerant, and desiccant modules mounted in the passages to remove water from the refrigerant.

The two cylinder parts are made of molded plastic and are round and cup shaped. The annular open sides of the two parts are attached together by a lug-in-groove twist lock connection. Further, the annular open sides have a scarf joint formed thereon, and the parts are bonded together at the joint to form a strong integral construction. A sight glass is provided at one end of the cylinder and a blow-out plug may be provided at the opposite end.

BRIEF DESCRIPTION OF THE DRAWINGS

The foregoing and other objects and advantages of the present invention will be better understood from the following detailed description taken in conjunction with the accompanying figures of the drawings, wherein:

FIG. 1 is a schematic diagram of an air-conditioning system including a drier in accordance with the invention;

FIG. 2 is a sectional view of a drier in accordance with the invention;

FIG. 3 is an exploded view of a drier shown in FIG. 2;

FIG. 4 is a view taken on the line 4—4 of FIG. 3; and

FIG. 5 is a view taken on the line 5—5 of FIG. 3.

DETAILED DESCRIPTION OF THE DRAWINGS

While the description and claims include such relative terms as top, bottom, inner and outer, these terms are used only to facilitate the description of the structure and should not be considered as limiting the scope of the invention to any particular orientation.

With reference first to FIG. 1, an air conditioning system including apparatus in accordance with the invention comprises a compressor or pump 10 connected to the intake of a condenser 12. Connected to the output of the condenser 12 is a drier 13, constructed in accordance with the present invention, and the outlet of the drier 13 is connected to an expansion valve 14. The outlet of the valve 14 is connected to an inlet of an evaporator 16 and the evaporator outlet is connected to the intake or low pressure side of the pump 10. The expansion valve 14 includes a temperature sensor 17 that senses the refrigerant temperature at the outlet of the evaporator 16 and controls the size of the valve 14 in accordance with this temperature. A refrigerant such as R-12 circulates through flow conduits which connect the components of the system, in the conventional and well known manner. In the example where the air conditioning system is installed in an automobile, the evaporator 16 is located to cool the passenger compartment of the automobile, and the pump 10 is connected to be driven by the automobile engine.

The drier 13 is illustrated in greater detail in FIGS. 2 through 5, and comprises a pressure cylinder formed by top and bottom parts 21 and 22. These two parts are secured together, as will be described hereinafter, to form an essentially unitary cylinder. The top part 21 includes a cylindrical wall 20 having an annular bottom end or edge 23. At the top of the part 21, inlet and outlet fittings 24 and 26 are provided which are connectable with conduits 27 and 28 (see FIG. 1), respectively. The conduit 27 extends between the outlet of the condenser 12 and the inlet fitting 24 whereas the conduit 28 extends from the outlet fitting 26 to the expansion valve 14.

Formed concentrically within the walls of the pressure cylinder is a flow tube 29 which has its upper end connected to the outlet fitting 26. Coolant flowing into the pressure cylinder from the inlet fitting 24 flows around the upper end of the flow tube 29 and downwardly between the outside of the tube 29 and the inside of the wall 20. A plurality of radially extending ribs 31 (see FIGS. 2 and 4) are formed on the interior surface of the wall 20 and extend fairly close to the outer surface of the flow tube 29 as shown in FIG. 2.

At the upper end of the top part 21 is also provided a transparent sight glass 32, the inner side of the glass 32 being located within the upper end of the flow tube 29. Thus, the coolant flowing through the flow tube 29 and to the outlet fitting 26 passes under the sight glass 32 and is visible through the sight glass. The sight glass 32, of course, serves to enable a technician to observe whether the refrigerant includes bubbles in order to determine whether the system needs servicing.

The bottom part 22 of the pressure cylinder has a substantially cup-shaped wall 33 and an open upper end or edge 34. Again, a plurality of ribs 36 (see FIG. 5) are formed on the interior surface of the wall 33. When the parts are assembled, the lower ends of the upper ribs 31 are spaced from the upper ends of the lower ribs 36, and the ribs serve, in addition to their function of strengthening the side walls of the pressure cylinder, to locate and support a filter and a drier. With specific reference to FIGS. 2 and 3, the filter comprises two disk-shaped layers 41 and 42 of a conventional filter material, and desiccant modules 43 are positioned between the two filter layers 41 and 42. The three elements 41, 42 and 43 have a centrally located opening and the flow tube 29 fits snugly within the opening as shown in FIG. 2. The outer diameter of the filter and the desiccant is substantially equal to the inner diameter of the wall 33 of the bottom part and therefore they fit snugly against the bottom part 22. When the parts are fully assembled as shown in FIG. 2, the refrigerant flows into the unit through the inlet fitting 24 and downwardly through the flow passage formed between the exterior of the flow tube 29 and the interior surfaces of the walls 20 and 33. The refrigerant flows between and within the ribs 31 and 36, through the filter layers 41 and 42 and through the desiccant 43 to the bottom of the pressure cylinder. The refrigerant then flows upwardly through the interior of the flow tube 29 to the outlet fitting 26.

As a safety measure, the unit further includes a blow-out plug which is located at the end of the unit which is opposite the sight glass 32. Consequently if a person is looking into the unit through the sight glass 32 and the pressure within the unit is so great that the cylinder bursts, the blow-out plug at the bottom of the unit will fail first and the refrigerant will burst from the bottom of the unit and not into the face of the person looking into the sight glass 32. The blow-out plug is formed by a circular piece 46 of the bottom wall 47 of the bottom part 22, the piece 46 being within an annular groove 48 (see FIGS. 2 and 5) that is formed in the bottom wall 47 substantially coaxially with the flow tube 29. The groove 48 thus forms a weakened portion of the wall 47 which will fail before any other part of the pressure cylinder fails.

The top part 21 and the bottom part 22 of the cylinder are secured together in accordance with the present invention to form a strong essentially single piece pressure cylinder. The connection is formed by a scarf joint at the adjacent edges 23 and 34 of the two parts, and the adjoining edges of the two parts ar secured together by an adhesive sealant. With reference first to FIGS. 2 and 3, the wall 20 of the top part 21 is radially thickened adjacent the edge 23 to form a radially enlarged ring 51 on the outer surface of the wall 20, and an annular upwardly extending groove 52 is formed between the ring 51 and a coaxial internal ring 53. The upper edge of the bottom part 22 is internally counterbored as indicated by the numeral 54, thereby forming an upwardly extending edge 56 which is sized to fit snugly within the groove 52 of the top part 21. When the top and bottom parts are assembled as shown in FIG. 2, the edge 56 extends into the groove 52, the internal ring 53 extends across the inner surface of the edge 56 and the outer ring 51 extends downwardly across the external surface of the bottom part 22.

The top and bottom parts are further connected by a twist-lock arrangement including two radially extending lugs 57 which project radially outwardly from the wall of the bottom part 22 adjacent the upper edge of the wall. Two right angle grooves 58 are formed in the opposite sides of the outer ring 51 of the top part, and the grooves are sized to receive the lugs 57. When the parts are assembled, the two parts are moved axially together with the two lugs 57 extending into the grooves 58 and then the two parts are rotated slightly relative to each other to move the lugs 57 into the transverse locking portions 59 of the grooves 58 in order to lock them together.

Before the two parts are assembled as described above, a solvent-adhesive-sealant is placed in the groove 52 and across the adjoining surfaces of the rings 51 and 52. The top and bottom parts 21 and 22 are made of a strong plastic material which reacts with the solvent-adhesive-sealant, whereby when the solvent-adhesive-sealant sets, the top and bottom parts are essentially a single piece unit. In addition to the strong bond formed by the solvent-adhesive-sealant, the twist-lock connection formed by the lugs 57 and the grooves 58 further strengthens the connection between the two parts. The twist-lock connection further serves to hold the parts in properly assembled positions while the solvent-adhesive-sealant sets, thereby dispensing with the need for jigs or fixtures.

To form space or clearance for excess solvent-adhesive-sealant when the parts are assembled, two spacers 61 (see FIG. 4) are formed at the bottom of the groove 52. The spacers 61 are small short projections which prevent the upper edge 56 from bottoming in the groove 52, thereby providing clearance space for the solvent-adhesive-sealant and enabling the parts to be interconnected. As a specific example of a suitable material for the pressure cylinder, a Noryll base plastic may be used, or, alternatively, a 420 Valox material. The solvent-adhesive-sealant should, of course, be a material which partially dissolves the plastic and then sets.

It will be apparent from the foregoing that a novel and useful drier for an air conditioning system has been provided. The drier may be formed of a plastic material which is readily molded, and does not introduce rust or contaminants, and the parts are easily assembled to form a complete drier without the need for expensive fixtures and assembly operations. The interconnection between the top and bottom parts forms an essentially single piece strong pressure cylinder. The blow-out plug 48, at the opposite end from the sight glass, is provided for safety purposes, and the ribs 31 and 36 serve both to strengthen the walls of the top and bottom parts and to support the filters and the desiccant both during assembly of the parts and during use of the drier.

What is claimed is:

1. A drier for an air conditioning system, comprising a cylinder formed by a cylindrical side wall, a bottom wall and a top wall, inlet and outlet fittings connected to said walls, said walls forming an interior refrigerant flow passage connected to said inlet and outlet fittings, said side wall including a top part and a bottom part, a plurality of first ribs formed on and extending radially inwardly from said side wall of said top part, a plurality of second ribs extending radially inwardly from said side wall of said bottom part, said top and bottom parts having adjoining annular edge portions and a joint connecting said edge portions to form an essentially single piece side wall, said first ribs being spaced from said second ribs and the space therebetween being adjacent said joint, and a desiccant in said space and supported by said ribs.

2. A drier as set forth in claim 1, and further including a plurality of filters, said desiccant being sandwiched between said filters.

3. A drier as set forth in claim 1, wherein said walls and said ribs are formed of a molded plastic, and said joint includes an adhesive-solvent-sealant on said edge portions.

4. A drier as set forth in claim 3, wherein said edges include overlapping surfaces.

5. A drier as set forth in claim 4, wherein said joint further includes a twist-lock connection.

6. A drier as set forth in claim 1 and further including a sight glass on one of said top and bottom walls and a blow-out means on the other of said top and bottom walls.

* * * * *